Figure 1:
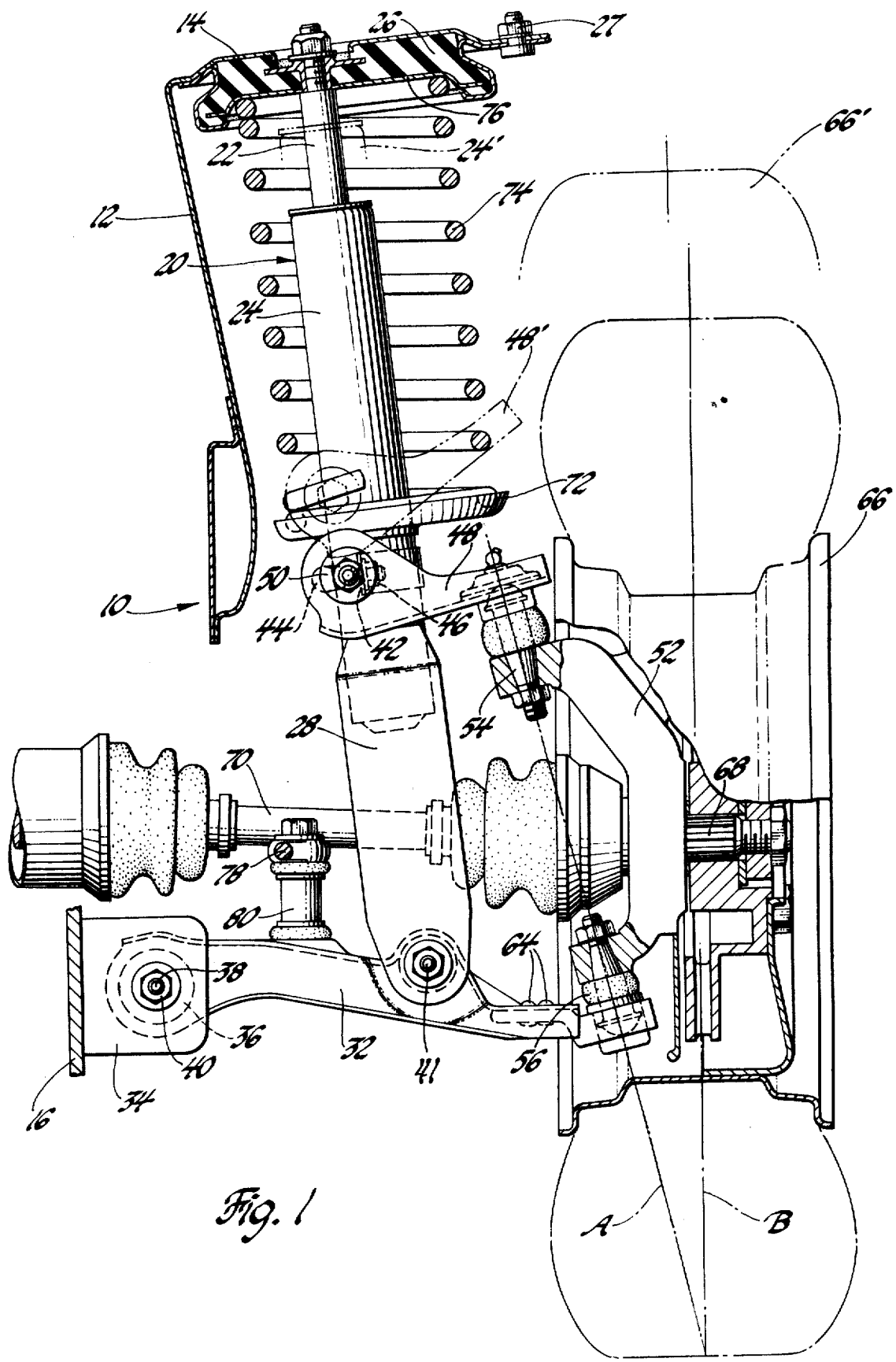

United States Patent [19]

Finn et al.

[11] 4,377,298
[45] Mar. 22, 1983

[54] VEHICLE WHEEL SUSPENSION

[75] Inventors: Bernard J. Finn, Troy; Ming-Chih Yew, Rochester, both of Mich.

[73] Assignee: General Motors Corporation, Detroit, Mich.

[21] Appl. No.: 272,702

[22] Filed: Jun. 11, 1981

[51] Int. Cl.³ .............................................. B60G 11/56
[52] U.S. Cl. .................................... 280/663; 280/667; 280/697; 280/696; 180/256; 267/34
[58] Field of Search .............. 280/660, 661, 662, 663, 280/664, 665, 666, 667, 668, 670, 672, 673, 675, 690, 691, 692, 693, 695, 696, 698, 697, 701, 700; 267/34, 20 A; 180/256

[56] References Cited

U.S. PATENT DOCUMENTS

| 2,876,018 | 3/1959 | Kishline | 280/667 |
| 3,024,040 | 3/1962 | Müller | 280/692 |
| 3,155,382 | 11/1964 | Shakespear | 280/667 |
| 4,105,222 | 8/1978 | Buchwald | 280/668 |

Primary Examiner—Robert R. Song
Attorney, Agent, or Firm—Dean L. Ellis

[57] ABSTRACT

In a vertical telescopic strut and transverse lower control arm type suspension, such elements are interconnected at a point substantially inboard between the ends of the control arm and the wheel support knuckle is substantially outboard of the strut axis at the distal outer end of the lower control arm. A second transversely extending control arm for the wheel knuckle is swingably mounted upon the lower telescopic portion of the strut above the lower control arm.

4 Claims, 2 Drawing Figures

VEHICLE WHEEL SUSPENSION

This invention relates to a vehicle wheel suspension and more particularly to a vehicle wheel suspension of the so-called MacPherson type incorporating vertical hydraulic dampener struts.

Strut type suspensions, i.e., those incorporating generally vertically arranged hydraulic dampener struts and transversely extending control arms, enjoy popular usage as a result of efficient space utilization, economy of parts, light weight and distribution of loads more widely through the unitized body/frame vehicle superstructures with which they are most commonly employed. At the same time, they afford desired kinematic characteristics for tailoring of such ride and handling factors as, inter alia, scrub radius, variation of treat during ride deflection, impact harshness, and roll response in cornering maneuvers. However, the strut proper has had to be of substantial height sufficient to accommodate dictated amounts of stroke during wheel jounce and rebound for satisfactory ride quality, and such height can result in relatively major limitations for the vehicle designer in accomplishing attractive vehicle side profiles.

The present invention provides a strut type suspension in which greater freedom is afforded the automotive stylist by enabling a lower overall height within the suspension assembly. The invention features a hydraulic dampener strut member arranged generally upright relative the vehicle sprung mass and attached at its upper end in a wheel well area of the superstructure, and a low-mounted transversely extending swingable lower control arm, all of which affords space utilization efficiency as in past practice. However, the strut and lower control arm are interconnected at the strut lower end at location on the control arm substantially inboard of its outer distal end. Strut stroke during vehicle wheel jounce and rebound is thus substantially reduced and the strut length commensurately shortened. The vehicle wheel support or knuckle is attached by suitable pivots to the outer distal end of the lower control arm and to an upper control arm thereabove, which upper control arm is swingably mounted at its inner end upon a lower telescopic portion of the strut. During wheel jounce and rebound, a compound motion of the upper control arm occurs.

In use, of this suspension, a variety of design parameters is available to the ride and handling engineer, as well, enabling selections for suspension roll center geometry, location of the steer axis (if it be a steerable wheel suspension), favorable impact isolation while retaining proper anti-dive, easy camber and caster settings, and favorable camber and toe-in change during ride deflection, etc.

The strut suspension of the invention is well adapted to simple steered or non-steered dead spindle usage, as well as to drive wheel or live spindle usage generally and front steered wheel live spindle usage in particular. A variety of main suspension springs may be used, whether helical, hydropneumatic leveling or pure air springs, and whether applied on the strut proper or on the lower control arm.

Figure 2:
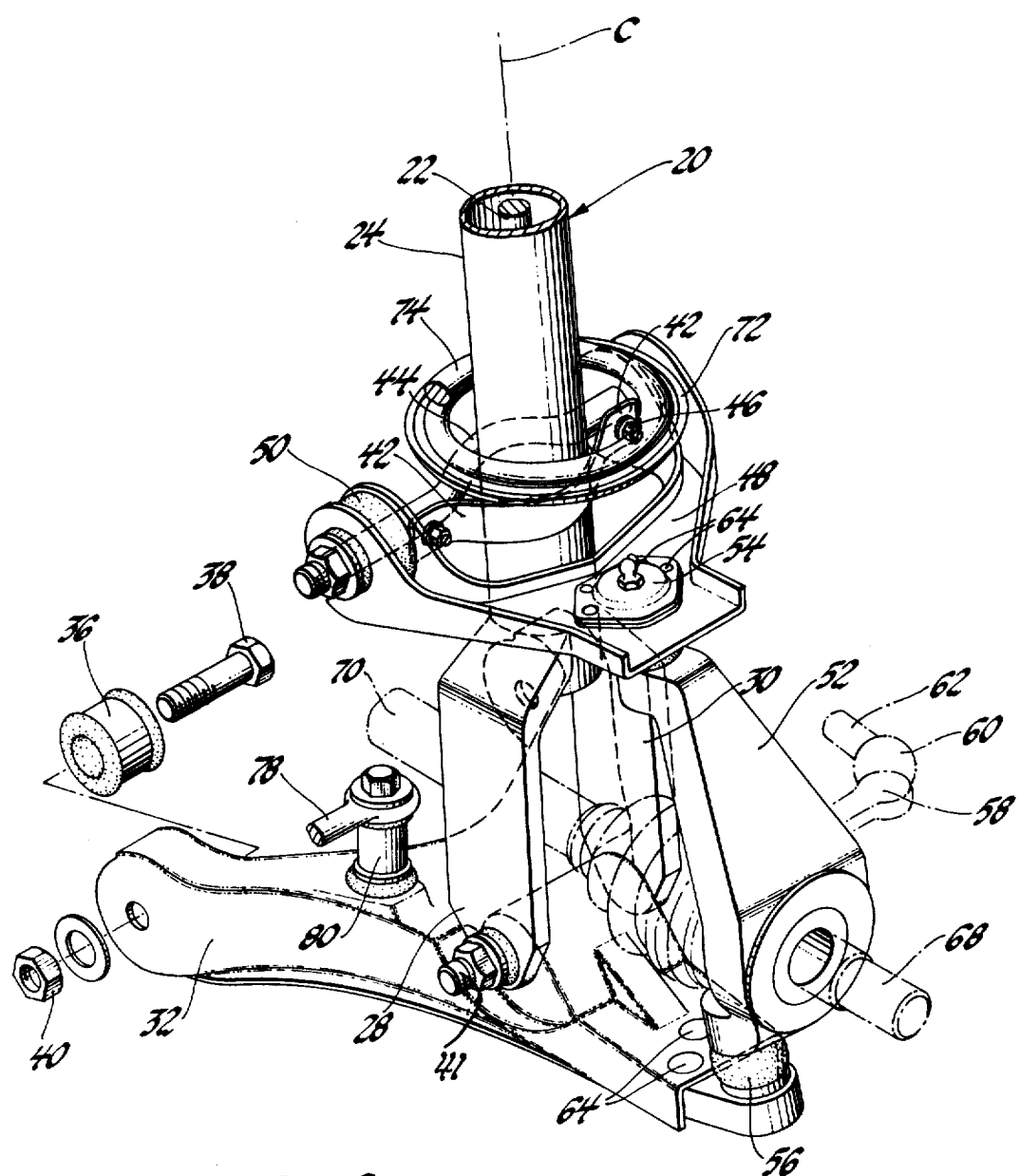

These and other objects, features and advantages of the invention will be apparent from the following specification and from the drawings wherein:

FIG. 1 is a front elevational view partly in section showing a drive wheel embodiment of a vehicle wheel suspension in accordance with the invention; and FIG. 2 is a fragmentary perspective view of the suspension shown in FIG. 1.

Referring to FIG. 1, the invention will be described in the environment of a drive axle or live spindle version, and it will be understood that such environment may be either at the front or rear wheels of the vehicle. The sprung mass or superstructure of such vehicle is designated generally as 10 and includes suitable reinforced stamped sheet metal structure 12 partially defining a wheel well for accommodating the wheel and suspension components, and which includes a generally horizontally disposed strut mounting panel 14. Nearer the center line of the sprung mass, such superstructure also includes a heavy sheet metal frame element 16 suitable for mounting of a suspension lower control arm.

The strut is generally indicated at 20 and preferably embodies directly therewithin a hydraulic suspension damper as is well known. It includes an upper dampener piston rod 22 which telescopes within a strut sleeve 24. Such sleeve 24 may be constructed to be the reservoir tube of the hydraulic damper, slidably fitted to a valved piston head on rod 22 all as is well known, or alternatively, the sleeve may be a receptacle for a separate such reservoir tube and piston rod assembly or cartridge installation, as is also well known in the art. The upper end of rod 22 is fastened to a rubber isolation mount assembly 26 which is in turn bolted to panel 14 as at 27.

Referring also to FIG. 2, there is provided at the lower end of such sleeve 24 a yoke configuration comprising legs 28 and 30, each of a reverse bend doubled sheet metal form. The sleeve may have these legs joined thereto as by welding. Alternatively, this yoke-shaped lower end element may be a separately fabricated item, forged or stamped to fabricate the legs 28 and 30 integrally with a tubular portion accepting a separate sleeve 24. In the instant live spindle embodiment, the two yoke legs 28 and 30 are spaced an appropriate distance apart to accept a drive axle as will be described.

A transversely extending lower control arm 32 of wishbone or A-frame construction has its two legs mounted at their inner ends upon brackets 34 of frame element 16 via the use of conventional rubber-bushed pivot elements 36 retained by suitable stud and nut fasteners 38 and 40, thereby to swingably mount the lower control arm 32 upon the vehicle superstructure yet provide isolation of road noise and vibration therefrom. In turn, yoke legs 28 and 30 are rotatably connected to control arm 32 via another stud and nut assembly 41 retained within like rubber-bushed pivot elements mounted in an upset portion of the control arm as shown.

Adjacent the yoke legs 28 and 30, a strap is welded to sleeve 24 or otherwise there is incorporated on the sleeve a pair of mounting ears 42. A control arm mounting trunnion or cross bar 44 is attached thereto as at 46 and aligned on a generally horizontal longitudinal axis of the vehicle sprung mass. An upper control arm 48, again of wishbone shape, has its leg portions pivotally mounted on the distal ends of cross bar 44 by rubber-bushed pivot elements 50. Thus, the upper control arm is mounted upon the strut 20 for swinging movement relative thereto as will occur in jounce and rebound movement of a wheel support member.

The wheel support member or knuckle 52 is of conventional cast or forged construction and includes upper and lower mounting legs having ball stud pivots 54 and 56 affixed thereto. Referring to FIG. 2, if the suspension of this invention is to be applied to front wheels, a steering arm 58 will extend from the knuckle rearwardly of the vehicle for connection with a ball stud pivot 60 incorporated on a steering tie rod, all of which is indicated in broken lines. It will be appreciated that in such a steered front wheel suspension, the pivot means 54 and 56 are specifically adapted to steered motion of the wheel knuckle on a generally vertical axis through these pivots by use of the specific ball stud type of connection. Of course, the invention also has equal application to suspensions for non-driven non-steered wheels. In any case, the ball stud pivots 54 and 56 enable toe-in settings for the knuckle, held by tie rods, but of course simple pivots may be used in place of the ball studs.

The ball socket portions of the ball studs 54 and 56 are each riveted as at 64 to the outer ends of the respective control arms 48 and 32. The knuckle 52 is thus articulatably mounted upon lower control arm 32 and upon strut 20 for wheel deflections relative sprung mass 10. A tire and wheel assembly 66 is mounted upon the spindle element 68 of knuckle 52 and includes the usual brake rotor apparatus cooperable with a brake assembly which may be installed on knuckle 52 in known manner. As indicated, the instant embodiment illustrates a live spindle version, with a drive axle 70 extending transversely from the sprung mass and journalled within knuckle 52 via the usual rotatable bearing support of spindle 68 therewithin.

Affixed to sleeve 24 above control arm 48 is a lower spring seat plate 72, and a coiled primary suspension spring 72 is seated thereupon and bears at its upper end on a spring seat plate 76 held by isolation coupling 26. The spring thus acts in compression between the two telescopic portions 22 and 24 of strut 20 to bear the load of the sprung mass 10 and transfer it through sleeve 24, ultimately to wheel assembly 66. For roll stabilization, a torsion bar of generally conventional configuration, indicated at 78, may be disposed transversely the sprung mass and connected to each opposite control arm 32 as by an elevated stud fastener 80.

From an examination of FIG. 1 it is seen that the present invention affords a marked advantage over prior art practice in the removal of the lower end connection of strut 20 to lower control arm 32 a substantial distance inboard of the distal end of such control arm, and from the plane of symmetry of tire and wheel assembly 66. Adequate amounts of jounce and rebound deflection are enabled for such tire and wheel assembly, but by the principle of levers the concomitant deflection or stroke of the piston rod 22 within a sleeve 24 is likewise significantly reduced. The difference is illustrated in FIG. 1 with broken line illustrations of the several parts with primed numerals for maximum jounce position. The uncovered length of rod 22 or clear distance between the top of the sleeve 24 and upper isolation mount 26 is substantially shortened at vehicle design height. A much lower superstructure in the area of tower panel 14 is thus possible, as compared with prior strut suspensions.

Strut 20 remains a principal load bearing and wheel guiding meber, and thus the known advantages of strut type suspensions are preserved and kinematic properties are not sacrificed. For example, the kingpin steer axis A in FIG. 1 may still intersect the median plane B of wheel assembly 66 at a favorable location for satisfactory scrub radius and the strut axis C, FIG. 2, may be tilted longitudinally of the sprung mass to reduce impact harshness as is known. Desired anti-drive geometry and ride deflection paths for wheel assembly 66 inducing proper camber and toe-in deflections therein may be retained. The use of an upper control arm may in fact be used to improve suspension kinematics. The combined translation and swinging motion of such arm, in combination with selection of the pivot axis of control arm 32, affords latitutde in designing front view swing centers for the wheel assembly. In addition, relative ease of adjustment of wheel camber settings is attained, as by use of shim packs between ears 42 and cross bar 44. Further, in a steered wheel version, the usual need for a rotatable upper strut mount bearing for strut rotation is eliminated, thus additionally simplifying the suspension.

The embodiments of the invention in which an exclusive property or privilege is claimed are defined as follows:

1. Wheel suspension for the sprung mass of a vehicle, comprising, a telescopic hydraulic dampener strut arranged generally upright in the vehicle and connected at its upper end to the sprung mass, a lower control arm extending transversely of the vehicle and swingably mounted at its inner end on the sprung mass, means at a selected location intermediate the ends of the lower control arm connecting the latter end and the lower end of said strut, an upper control arm extending transversely of the vehicle, means swingably mounting the inner end of the upper control arm on the strut intermediate the ends thereof, a wheel support member, pivot means mounting the wheel support member on the upper and lower control arms adjacent the outer ends thereof, and a suspension spring arranged to bear loads transferred between the sprung mass and the wheel support member.

2. Steered wheel suspension for the sprung mass of a vehicle, comprising, a telescopic hydraulic dampener strut arranged generally upright in the vehicle and connected at its upper end to the sprung mass, a lower control arm extending transversely of the vehicle and swingably mounted at its inner end on the sprung mass, means at a selected location intermediate the ends of the lower control arm connecting the latter with the lower end of said strut, an upper control arm extending transversely of the vehicle, means swingably mounting the inner end of the lower control arm on the strut member intermediate the ends thereof, a wheel support member, ball stud means mounting the wheel support member on the upper and lower control arms adjacent the outer ends thereof for steered rotation relative thereto on a generally vertical axis, and a suspension spring arranged to bear loads transferred between the sprung mass and the wheel support member.

3. Drive wheel suspension for the sprung mass of a vehicle, comprising, a telescopic hydraulic dampener strut arranged generally upright in the vehicle and connected at its upper end to the sprung mass, a lower control arm extending transversely of the vehicle and swingably mounted at its inner end on the sprung mass, means at a selected location intermediate the ends of the lower control arm connecting the latter and the lower end of said strut, an upper control arm extending transversely of the vehicle, means swingably mounting the inner end of the upper control arm on the strut intermediate the ends thereof, a wheel support member including a drive spindle rotatable therein, pivot means mounting the wheel support member on the upper and lower control arms adjacent the outer ends thereof, drive axle means extending transversely of the vehicle generally through the upright plane including the telescoping axis of said strut, the lower end portion of said strut being constructed out of said plane to accommodate the passage transversely thereof of said drive axle means, and a suspension spring arranged to bear loads transferred between the sprung mass and the wheel support member.

4. Steered drive wheel suspension for the sprung mass of a vehicle, comprising, a telescopic hydraulic dampener strut arranged generally upright in the vehicle and connected at its upper end to the sprung mass, said strut member including a yoke-shaped lower end portion, a wishbone-like lower control arm extending transversely of the vehicle and swingably mounted at the inner ends of its arms on pivots spaced longitudinally on the sprung mass, pivot means at a selected location intermediate the ends of the lower control arm connecting the latter with the legs of the lower yoke portion of said strut member, an upper control arm extending transversely of the vehicle, a trunnion affixed to the strut on an axis longitudinal of the vehicle above said lower strut end portion mounting the inner ends of the upper control arm on the strut, a wheel support member including a drive spindle rotatable therein, drive axle means extending transversely of the vehicle between the legs of said lower strut end portion and connected to said spindle, ball stud means mounting the wheel support member on the upper and lower control arms adjacent the outer ends thereof for steered rotation relative thereto on a generally vertical axis, and a suspension spring arranged to bear loads transferred between the sprung mass and the wheel support member.

* * * * *